United States Patent Office 3,826,803
Patented July 30, 1974

---

3,826,803
ARABINOFURANOSYL-8-AZAADENINES
Richard L. Tolman, Costa Mesa, Calif., and Clive W. Smith, Angus, Scotland, assignors to ICN Pharmaceuticals, Inc., Irvine, Calif.
No Drawing. Filed Feb. 17, 1972, Ser. No. 209,352
Int. Cl. C07d 95/04, 51/54
U.S. Cl. 260—211.5 R        15 Claims

ABSTRACT OF THE DISCLOSURE

Arabinofuranosyl-8-azaadenines are prepared by, e.g., ring closing appropriately blocked 1-azido sugars with cyanoacetamide to form 1-$D$-arabinofuranosyl-5-amino-4-carbamoyl-$v$-triazoles, which are dehydrated to the corresponding nitriles and cyclized to yield the nucleosides of interest. 9-$\alpha$-$D$-Arabinofuranosyl-8-azaadenine, alone or in the form of its 5'-phosphate, is deaminase resistant and active against vaccinia and herpes simplex viruses. The corresponding $\beta$ anomer may be expected to serve as a purine nucleoside antagonist (as a substrate for one or both of DNA polymerase or ribonucleotide reductase) and its precursor 1-$\beta$-$D$-arabinofuranosyl-5-amino-4-carbamoyl-$v$-triazole to regulate purine metabolism and inhibit *de novo* purine biosynthesis.

BACKGROUND OF THE INVENTION

Derivatives of $v$-triazolo[4,5-d]pyrimidine such as 8-azaguanine have received considerable attention as purine antagonists in biological systems including viruses and cancer. Growing interest in the biological activity of the nucleosides of like purine analogs has been reflected in studies of 9-$\beta$-$D$-ribofuranosyl-8-azaadenine [e.g., Montgomery *et al.*, J. Heterocyclic Chem. 7, 215 (1970)], 9-$\alpha$ and $\beta$-$D$-xylofuranosyl-8-azaadenine [Lee *et al.*, *Chem. Ind.* (London) 2007 (1964)] and 9-$\beta$-$D$-ribofuranosyl-8-azainosine [e.g., J. A. Montgomery *et al., J. Chem. Soc. Chem. Commun.*, 265 (1970)]. The latter compound has been shown to exhibit significant activity against leukemia L1210 and adenocarcinoma 655. The biological activity of 9-$\beta$-$D$-arabinofuranosyl-adenine (Ara-A) is well documented, and in particular its antiviral action has received considerable study, e.g., as reported by various workers in *Antimicrobial Agents Chemotherapy* 136, 148, 161, 172, 180 (1968). Although Ara-A is one of but a few synthetic antiviral agents currently under clinical study, its efficacy in that employment is substantially diminished by its susceptibility to enzymatic deamination, whereupon its biological activity is lost.

BRIEF SUMMARY OF THE INVENTION

According to this invention there are provided novel arabinofuranosyl-8-azaadenines, as well as novel precursors therefor. A preferred compound of the invention, 9-$\alpha$-$D$-arabinofuranosyl-8-azaadenine, exhibits significant activity against herpes simplex and vaccinia viruses while resisting enzymatic deamination. The corresponding $\beta$ anomer is of interest as a purine nucleoside antagonist. The similarity of its precursor 1-$\beta$-$D$-arabinofuranosyl-5-amino-4-carbamoyl-8-azaadenine to 1-$\beta$-$D$-ribofuranosyl-5 - amino-4-carbamoyl-imidazole (AICAR), a key intermediate in *de novo* purine biosynthesis, justifies the expectation that the former compound will find utility in the regulation of purine metabolism. Also provided by the invention is a novel method by which the yield of the $\alpha$-anomer may be maximized.

DETAILED DESCRIPTION OF THE INVENTION

The title compounds may be obtained in blocked form by isolation from the isomeric product resulting when 2,3,5-tri-$O$-benzyl-$D$-arabinofuranosyl chloride and the trimethylsilyl derivative of 7-methylthio-$v$-triazolo [4,5-d] pyrimidine are fused and treated with methanolic ammonia. Preferably, however, the compounds are obtained from novel 1-azido arabinosyl sugars, in a manner next discussed with reference to the following flow-sheet, in which glycosyl blocking groups are variously denoted as "Ac" (acetyl) and "B" (benzyl). While acetyl is the most commonly used acyl blocking group, it will be understood that any acyl group, e.g., $C_1$-$C_{18}$ acyl, may be employed to preserve glycosyl hydroxyls against side reactions such as dehydration during synthesis of the compounds of the invention.

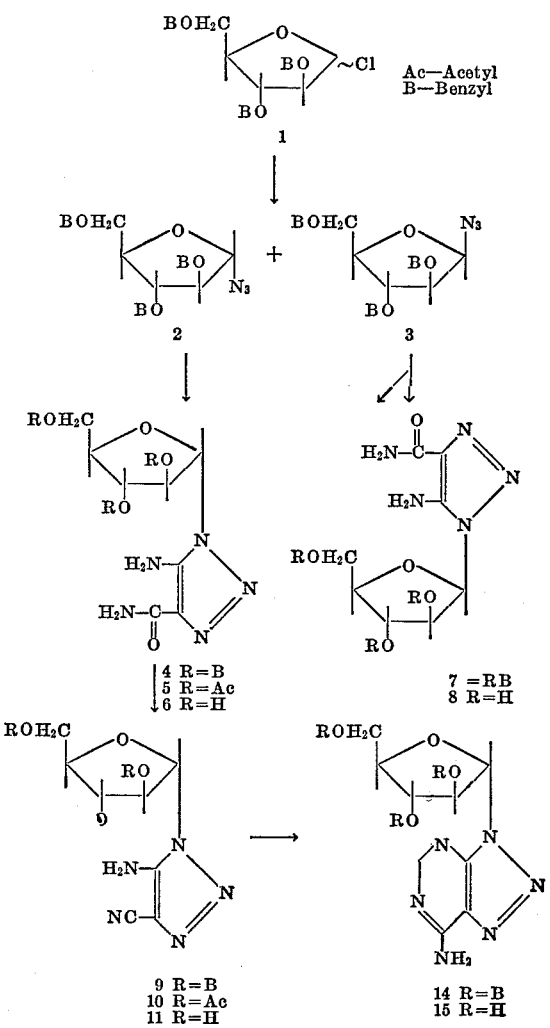

In the first step, the known compound 2,3,5-tri-$O$-benzyl-$D$-arabinofuranosyl chloride (1) is treated with alkali azide at, e.g., from about 50 to about 150° C. in acetonitrile or other non-aqueous, anion-stabilizing solvent (e.g., DMF, DMSO, hexamethylphosphoric triamide), yielding an anomeric mixture of the corresponding azides (2) and (3). Where the halide reactant (1) is not freshly prepared, about half the azide product is $\alpha$ and half the $\beta$ anomer, whereas freshly prepared reactant yields substantially more $\beta$ than $\alpha$ anomer. In any case, we have found that upon subsequent ring closure with cyanoacetamide the $\beta$ azide (3) is anomerized, yielding as much as 14 times more 5-amino-1-(2',3',5'-tri-$O$-benzyl-$\alpha$-$D$- arabinofuranosyl)-4-carbamoyl v-triazole (4) than corresponding β anomer (7). Cyanoacetamide in water with base is combined with the azide in a non-aqueous solvent such as DMF and the ring closure reaction had at from about 0° C. to about 40° C. (preferably at room temperature). Where a solvent such as tetrahydrofurane is employed, reaction may be at greater temperature, e.g., at reflux. Compounds (4) and (7) may be separated by silica gel column chromatography, and ring-closed and debenzylated to yield the corresponding novel 9-D-arabinofuranosyl-8-azainosine compounds. In the illustrated case, the carboxamide (4) is dehydrated by treatment with toluene-p-sulphonyl chloride in pyridine to form corresponding cyano compound (9), which is in turn cyclized with diethoxymethyl acetate and methanolic ammonia to afford 2',3',5' - tri-O-benzyl-9-α-D-arabinofuranosyl-8-azaadenine (14). The β carboxamide (7), of course, may be similarly reacted to afford the blocked β-arabinosyl-8-azaadenine compound. Removal of benzyl blocking groups from the 8-azaadenine compounds by catalytic hydrogenation affords but low yields, whereas those groups are readily removed from the carbamoyl triazoles (4) and (7). Cyclization of the resulting free nucleosides (6) and (8), however, permits byproduct formation by side reactions with unprotected glycosyl moieties. Accordingly, for example, we protect the glycosyl hydroxyls of (6) with acetyl, affording compound (10) in high yield upon dehydration of the protected compound (5). Cyclization of (10) in methanolic ammonia removes the acyl blocking groups, affording the free nucleoside (15). The β intermediates undergo similar reactions, as appears from the following examples.

EXAMPLE 1

2,3,5-Tri-O-benzyl-D-arabinofuanosyl azides (2) and (3)

2,3,5 - Tri-O-benzyl-D-arabinofuranosyl chloride (1) (9.8 g.) was dissolved in acetonitrile (125 ml.) and heated under reflux with sodium azide (10.0 g.) for 2 hr. The mixture was filtered, the residue washed with chloroform and the filtrate and washings combined and evaporated in vacuo to give a tan syrup (8.9 g.). This was chromatographed on a silica gel column eluting with ligroine-ethyl acetate (9:1, v./v.). Two major syrupy components were obtained; one was identified as 2,3,4 - tri-O-benzyl-α-D-arabinofuranosyl azide (2) (1.8 g.; 21%): $[\alpha]_D^{25}$ 111.5° (c 1.0, CHCl$_3$); IR 2115 cm.$^{-1}$ (azide); PMR (CDCl$_3$) 5.38 p.p.m. (s, 1, J$_{1,2}$ <1 Hz., 1-H).
Analysis.—Calcd. for C$_{26}$H$_{27}$N$_3$O$_4$: C, 70.09; H, 6.11; N, 9.43. Found: C, 70.07; H, 6.00; N, 9.46.

The other major component was 2,3,5-tri-O-benzyl-β-D-arabinofuranosyl azide (3) (5.5 g.; 62%): $[\alpha]_D^{25}$ −118.2° (c 1.0, CHCl$_3$); IR 2115 cm.$^{-1}$ (azide); PMR (CDCl$_3$) 5.10 p.p.m. (d, 1, J$_{1,2}$ =4.0 Hz., 1-H).
Analysis.—Calc'd for C$_{26}$H$_{27}$N$_3$O$_4$: C, 70.09; H, 6.11; N, 91.43. Found: C, 70.12; H, 6.04; N, 9.30.

EXAMPLE 2

1-(2',3',5'-Tri-O-benzyl-β-D-arabinofuranosyl)-5-amino-4-carbamoyl-v-triazole (1) and the α-anomer (4)

2,3,5 - Tri - O-benzyl-β-D-arabinofuranosyl azide (3) (17.0 g.) was added to a cooled solution of potassium hydroxide (3.2 g.) and cyanoacetamide (4.8 g.) in water (25 ml.) and DMF (250 ml.). The yellow solution was allowed to slowly warm up to room temperature over three hours and then evaporated to dryness in vacuo. The residue was dissolved in methanol (100 ml.) and the solution neutralized with Dowex 50 H+ form 100-200 mesh. After filtration the filtrate was evaporated to dryness in vacuo and the residue partitioned between water and ethyl acetate. The ethyl acetate solution was evaporated to dryness in vacuo and the residual syrup chromatographed on a silica gel column eluting with chloroform-acetone (9:1, v./v.). 5-Amino - 1 - (2',3',5'-tri-O-benzyl-α-D-arabinofuranosyl) - 4-carbamoyl-v-triazole (4) was obtained as white crystals (14.7 g.; 72%): m.p. 69-71°; $[\alpha]_D^{25}$ 60.3° (c 1.0, CHCl$_3$);

UV, $\lambda_{max.}^{pH 1}$ 262 nm. (ε 11,100); $\lambda_{max.}^{MeOH}$ 235 nm. (ε 9,450); and 259 nm. (ε 9,250); $\lambda_{max.}^{pH 11}$ 237 nm. (ε 11,700) and 262 nm. (ε 11,400);

PMR (CDCl$_3$) 6.05 p.p.m. (d, 1, J$_{1',2'}$=4.0 Hz., 1'-H).
Analysis.—Calc'd for C$_{29}$H$_{31}$N$_5$O$_5$: C, 65.77; H, 5.90; N, 13.23. Found: C, 65.70; H, 6.09; N, 12.95.

The minor component obtained from the column was identified as 5-amino-1-(2',3',5'-tri-O-benzyl-β-D-arabinofuranosyl) - 4 - carbamoyl-v-triazole (7) (0.9 g.; 5%): $[\alpha]_D^{25}$ −43.0° (c 1.0, CHCl$_3$);

UV, $\lambda_{max.}^{pH 1}$ 261 nm. (ε 10,800); $\lambda_{max.}^{MeOH}$ 236 nm. (ε 9,100) and 259 nm. (ε 8,250); $\lambda_{max.}^{pH}$ 237 nm. (ε 9,950) and 261 nm. (ε 9,100);

PMR (CDCl$_3$) 6.52 p.p.m. (d, 1, J$_{1',2'}$ −5.0 Hz., 1'-H).
Analysis.—Calc'd for C$_{29}$H$_{31}$N$_5$O$_5$: C, 65.77; H, 5.90; N, 13.23. Found: C, 65.77; H, 5.96; N, 12.98.

Compound (4) was obtained as the sole product on treatment of (2) with cyanoacetamide by the above method.

EXAMPLE 3

5-Amino-1-(2',3',5'-tri-O-benzyl-α-D-arabinofuranosyl)-4-cyano-v-triazole (9)

5-Amino - 1 - (2',3',5'-tri-O-benzyl-α-D-arabinofuranosyl)-4-carbamoyl-v-triazole (4) (1.1 g.) was dissolved in dry pyridine (20 ml.) and treated with p-toluenesulphonyl chloride (1.5 g.). The solution was left at room temperature overnight and then water was added and the solution extracted with ethyl acetate. The organic layer was washed with water and then evaporated in vacuo to give a syrup which crystallized on standing. Recrystallization from methanol gave an analytical sample of (9) (0.8 g.; 75%): m.p. 114–115° $[\alpha]_D^{32}$ 72.3° (c 1.0, CHCl$_3$); IR 2220 cm.$^{-1}$ (CEN);

UV, $\lambda_{max.}^{MeOH}$ 231 nm. (ε 10,800) and 251 (sh) nm. (ε 8,300);

PMR (CDCl$_3$) 5.20 p.p.m. (s, 2, C-5 NH$_2$), 6.05 p.p.m. (d, 1, J$_{1',2'}$=3.0 Hz., 1'-H).
Analysis.—Calc'd for C$_{29}$H$_{29}$N$_5$O$_4$: C, 68.08; H, 5.71; N, 13.69. Found: C, 68.24; H, 5.75; N, 13.71.

EXAMPLE 4

5-Amino-1-(2',3',5'-tri-O-benzyl-8-D-arabinofuranosyl)-4-cyano-v- triazole (12)

The procedure was as for (9) starting with compound (7). Yield 77%: $[\alpha]_D^{25}$ −31.3° (c 1.0, CHCl$_3$); IR 2220 cm.$^{-1}$ (CEN);

UV, $\lambda_{max.}^{MeOH}$ 230 nm. (ε 10,200) and 250 (sh) nm. (ε 6,650);

PMR (CDCl$_3$) 5.25 p.p.m. (s, 2, C-5 NH$_2$), 6.64 p.p.m. (d, 1, J$_{1',2'}$=6.0 Hz., 1'-H).
Analysis.—Calc'd for C$_{29}$H$_{29}$N$_5$O$_4$: C, 68.08; H, 5.71; N, 13.69. Found: C, 68.36; H, 5.86; N, 13.73.

EXAMPLE 5

2',3',5'-Tri-O-benzyl-9-α-D-arabinofuranosyl-8-azaadenine (14)

5 - Amino - 1 - (2',3',5' - tri-O-benzoyl-α-D-arabinofuranosyl) - 4 - cyano-v-triazole (9) (0.5 g.) was heated under reflux in diethoxymethyl acetate (10 ml.) for 4 hr. The yellow solution was evaporated in vacuo and the resulting syrup was dissolved in methanolic ammonia (50 ml., saturated at 0°) and allowed to stand in a sealed vessel at room temperature overnight. The solution was evaporated to dryness in vacuo and the residue recrystallized from chloroform-ligroine to give (14) as white needles: m.p. 63–65; $[\alpha]_D^{25}$ 84.5° (c 1.0, CHCl$_3$);

UV, $\lambda_{max.}^{pH\ 1}$ 261 nm. ($\epsilon$ 11,600); $\lambda_{max.}^{MeOH}$ 278 nm. ($\epsilon$ 11,300);

PMR (CDCl$_3$) 5.30 p.p.m. (t, 1, J$_{1'}$, $_{2'}$=5.0 Hz., J$_{2',3'}$≃0 Hz., 2'-H) 6.50 p.p.m. (d, 1, J$_{1',2'}$=5.0 Hz., 1'-H), 8.45 p.p.m. (s, 1, 2-H).

*Analysis.*—Calc'd for C$_{30}$H$_{30}$N$_6$O$_4$: C, 66.90; H, 5.61; N, 15.61. Found: C, 66.74; H, 5.50; N, 15.51.

EXAMPLE 6

2',3',5'-Tri-O-benzyl-9-β-D-arabinofuranosyl-8-azaadenine (4)

The procedure was as for compound (14) starting with compound (12) m.p. 165–166°; $[\alpha]_D^{25}$ —48.3° (c 1.0, CHCl$_3$);

UV, $\lambda_{max.}^{pH\ 1}$ 262 nm. ($\epsilon$ 10,300); $\lambda_{max.}^{MeOH}$ 278 nm. ($\epsilon$ 11,300);

PMR (CDCl$_3$) 8.42 p.p.m. (s, 1, 2-H).

*Analysis.*—Calc'd for C$_{30}$H$_{30}$N$_6$O$_4$: C, 66.90; H, 5.61; N, 15.61. Found: C, 67.24; H, 5.79; N, 15.59.

EXAMPLE 7

5-Amino-1-α-D-arabinofuranosyl-4-carbamoyl-v-triazole (6)

Method 1. Sodium was added, in small portions, to a stirred suspension of 5 - amino - 1 - (2',3',5'-tri-O-benzyl-α-D-arabinofuranosyl)-4-carbamoyl-v-triazole (4) (4.0 g.) in liquid ammonia (100 ml.) until the deep blue color persisted. The color was discharged by careful addition of ammonium chloride and the reaction mixture allowed to evaporate to dryness under a stream of nitrogen. The solid residue was triturated with benzene (50 ml.) and then suspended in solvent E (ethyl acetate-n-propyl alcohol-water: 4:1:2, v./v./v.-upper phase) and the inorganic salts removed by passage through a silica gel column eluting with solvent E. Recrystallization from ethanol gave 1.2 g. (61%) of (6): m.p. 147–149°; $[\alpha]_D^{25}$ 131.7° (c 1.0, H$_2$O);

UV, $\lambda_{max.}^{pH\ 1}$ 235 nm. ($\epsilon$ 8,100) and 260 ($\epsilon$ 7,700); $\lambda_{max.}^{pH\ 7}$ 234 nm. ($\epsilon$ 8,550) and 258 nm. ($\epsilon$ 7,950); $\lambda_{max.}^{pH\ 11}$ 234 nm. ($\epsilon$ 8,550) and 258 nm. ($\epsilon$ 7,950); $\lambda_{max.}^{pH\ 11}$ 234 nm. ($\epsilon$ 8,550) and 260 nm. ($\epsilon$ 7,700);

PMR (DMSO-d$_6$) 5.78 p.p.m. (d, 1, J$_{1',2'}$=6.0 Hz., 1'-H), 6.52 (s, 2, C-5 NH$_2$), 7.30 (s, 2, C-4 CONH$_2$).

*Analysis.*—Calc'd for C$_8$H$_{13}$N$_5$O$_5$: C, 37.07; H, 5.06; N, 27.02. Found: C, 36.84; H, 5.09; N, 27.09.

Method 2. A solution of (4) (1.0 g.) in 2-methoxyethanol was hydrogenated in a Parr Hydrogenator at 40 p.s.i. and 50° for 24 hr. using 10% palladium on charcoal (1.0 g.) as catalyst. The mixture was filtered and the filtrate evaporated to dryness in vacuo to give 0.47 g. (95%) of (6) identical in all respects to the product from Method 1.

EXAMPLE 8

5-Amino-1-β-D-arabinofuranosyl-4-carbamoyl-v-triazole (8)

The procedure was as for compound (6), Method 1, starting with compound (7). Yield 75%: $[\alpha]_D^{25}$ —19.3° (c, 1.2, DMF);

$\lambda_{max.}^{pH\ 1,7,11}$ 234 nm. ($\epsilon$ 8,000) and 258 nm. ($\epsilon$ 7,800);

PMR (DMSO-d$_6$) 6.12 p.p.m. (d, 1, J$_{1',2'}$=5.0 Hz., 1'-H), 6.35 p.p.m. (s, 2, C-5 NH$_2$), 7.25 p.p.m. (broad s, 2, C-4 CONH$_2$).

*Analysis.*—Calc'd for C$_8$H$_{13}$N$_5$O$_5$: C, 37.07; H, 5.06; N, 27.02. Found: C, 36.90; H, 5.00; N, 27.10.

EXAMPLE 9

5-Amino-1-α-D-arabinofuranosyl-4-cyano-v-triazole (11)

Sodium was added, in small portions, to a stirred suspension of 5 - amino - 1 - (2',3',5' - tri-O-benzyl-α-D-arabinofuranosyl) - 4 - cyano-v-triazole (9) (1.0 g.) in liquid ammonia (100 ml.) until the deep blue color persisted. The color was discharged by careful addition of ammonium chloride and the reaction mixture allowed to evaporate to dryness under a stream of nitrogen. The solid residue was triturated with benzene (20 ml.) and then dissolved in solvent E (ethyl acetate-n-propyl alcohol-water: 4:1:2, v./v./v.-upper phase) and the inorganic salts removed by passage through a silica gel column eluting with solvent E to give 5-amino-1-α-D-arabinofuranosyl - 4 - cyano-v-triazole (11) (150 mg.; 32%): m.p. 167–168°; $[\alpha]_D^{25}$ 141.3° (c 1.0, H$_2$O); IR 2220 cm.$^{-1}$ (CEN);

UV, $\lambda_{max.}^{pH\ 1\ \&\ 7}$ 228 nm. ($\epsilon$ 9,900) and 252 nm. ($\epsilon$ 6,750); $\lambda_{max.}^{pH\ 11}$ 231 nm. ($\epsilon$ 8,950) and 252 nm. ($\epsilon$ 6,750);

PMR (DMSO-d$_6$) 5.80 p.p.m. (d, 1, J$_{1',2'}$=6.0 Hz., 1'-H), 7.32 p.p.m. (s, 2, C-5 NH$_2$).

*Analysis.*—Calc'd for C$_8$H$_{11}$N$_5$O$_4$: C, 39.83; H, 4.60; N, 29.04. Found: C, 39.64; H, 4.71; N, 29.31.

EXAMPLE 10

1-(2',3',5'-Tri-O-acetyl-α-D-arabinofuranosyl)-5-amino-4-carbamoyl-v-triazole (5)

5 - Amino - 1 - α - D - arabinofuranosyl-4-carbamoyl-v-triazole (6) (250 mg.) was acetylated by standard procedures using acetic anhydride in pyridine to give, after recrystallization from chloroform-ligroine 270 mg. (75%) of (5): m.p. 89–91°; $[\alpha]_D^{25}$ 59.5° (c 1.0, CHCl$_3$);

UV, $\lambda_{max.}^{pH\ 1}$ 234 nm. ($\epsilon$ 9,250) and 261 nm. ($\epsilon$ 8,250); $\lambda_{max.}^{MeOH}$ 236 nm. ($\epsilon$ 9,450) and 258 nm. ($\epsilon$ 8,450); $\lambda_{max.}^{pH\ 11}$ 236 nm. ($\epsilon$ 8,500) and 261 nm. ($\epsilon$ 8,100);

PMR (CDCl$_3$) 6.30 p.p.m. (d, 1, J$_{1',2'}$=3.5 Hz., 1'-H), 6.62 p.p.m. (s, 2, C-5 NH$_2$), 7.30 p.p.m. (s, 2, C-4 CONH$_2$).

*Analysis.*—Calc'd for C$_{14}$H$_{19}$N$_5$O$_8$: C, 43.64; H, 4.97; N, 18.18. Found: C, 43.60; H, 4.75; N, 18.10.

EXAMPLE 11

1-(2',3',5'-Tri-O-acetyl-α-D-arabinofuranosyl)-5-amino-4-cyano-v-triazole (10)

Method 1. 1 - (2',3',5' - Tri - O - acetyl-α-D-arabinofuranosyl) - 5 - amino - 4 - carbamoyl-v-triazole (5) (500 mg.) was dissolved in dry pyridine (10 ml.) and treated with p-toluenesulphonyl chloride (750 mg.). The solution was left at room temperature overnight and then water added and the solution extracted with ethyl acetate. The organic layer was washed with water and then evaporated in vacuo to give (10) (340 mg.; 72%) as a syrup: $[\alpha]_D^{25}$ 51.7° (c. 1.3, CHCl$_3$); IR 2220 cm.$^{-1}$ (CEN);

UV, $\lambda_{max.}^{pH\ 1}$ 228 nm. ($\epsilon$ 9,900) and 250 (sh) nm. ($\epsilon$ 7,700); $\lambda_{max.}^{pH\ 7}$ 227 nm. ($\epsilon$ 10,500) and 250 (sh) nm. ($\epsilon$ 6,600); $\lambda_{max.}^{pH\ 11}$ 232 nm. ($\epsilon$ 8,100) and 250 (sh) nm. ($\epsilon$ 6,600).

*Analysis.*—Calc'd for C$_{14}$H$_{17}$N$_5$O$_7$: C, 45.77; H, 4.67; N, 19.07. Found: C, 46.07; H, 4.45; N, 18.90.

Method 2. 5-Amino-1-α-D-arabinofuranosyl-4-cyano-v-triazole (11) was acetylated by standard procedures using acetic anhydride in pyridine to give syrupy (10) identical in all respects to the product from Method 1.

EXAMPLE 12

9-α-D-Arabinofuranosyl-8-azaadenine (15)

Method 1. 1 - (2',3',5'-Tri-O-acetyl-α-D-arabinofuranosyl)-5-amino-4-cyano-v-triazole (10) (350 mg.) was heated under reflux in diethoxymethyl acetate (10 ml.) for 4 hr. The orange solution was evaporated to dryness in vacuo and the resulting amber syrup was dissolved in methanolic ammonia (50 ml., saturated at 0°) and allowed to stand in a sealed vessel at room temperature for two days. The solution was evaporated to dryness in vacuo and the residue recrystallized from water to give 0.13 g.

(75%) of (15): m.p. 239–241°; $[\alpha]_D^{25}$ +128.8° (c 0.3, H$_2$O);

UV, $\lambda_{max}^{pH\,1}$ 261 nm. ($\epsilon$ 12,900); $\lambda_{max}^{pH\,7}$ 277 nm. ($\epsilon$ 12,100); $\lambda_{max}^{pH\,11}$ 277 nm. ($\epsilon$ 12,100);

PMR (DMSO-d$_6$) 5.12 p.p.m. (t, 1, J$_{1',2'}$=6.5 Hz., J$_{2',3'}\simeq$0 Hz., 2'-H), 6.23 p.p.m. (d, 1, J$_{1',2'}$=6.5 Hz., 1'-H), 8.43 p.p.m. (s, 1, 2-H).

Analysis.—Calc'd for C$_9$H$_{12}$N$_6$O$_4$: C, 40.30; H, 4.51; N, 31.33. Found: C, 40.56; H, 4.52; N, 31.42.

Method 2. The procedure was as for (23), Method 2, starting with (15) to give a product identical in all respects with the product obtained from Method 1.

EXAMPLE 13

9-β-D-Arabinofuranosyl-8-azaadenine (17)

The procedure was as for compound (15), Method 2, starting with compound (16). Yield 68%; m.p. 212–13° C.; $[\alpha]_D^{25}$ −24.0 (c 0.5, H$_2$O);

UV $\lambda_{max}^{pH\,1}$ 262 nm. ($\epsilon$ 11,300); $\lambda_{max}^{pH\,7.11}$ 277 nm. ($\epsilon$ 10,700);

PMR (DMSO-d$_6$) 6.50 p.p.m. (d, 2, J$_{1',2'}$=6.5 Hz., 1'-H), 8.32 p.p.m. (s, 1, H-2).

Analysis.—Calc'd C$_9$H$_{12}$N$_6$O$_4$: H$_2$O; C, 38.98; H, 5.09; N, 30.31. Found: C, 39.30; H, 4.83; N, 29.98.

EXAMPLE 14

Compound (11) was tested for antiviral activity by the virus rating (VR) method of Sidwell et al., Proc. Soc. Exp. Biol. Med 131, 1223–30 (1969) V.R.>1.0 is indicative of definite antiviral activity and V.R. of 0.5–0.9 indicative of moderate antiviral activity while V.R.<0.5 suggests slight or no apparent antiviral activity. The following data was taken.

TABLE I.—ANTIVIRAL ACTIVITY OF 9-α-D-ARABINOFURANOSYL-8-AZAADENINE

| Virus | Virus conc. (CCID$_{50}$/ml.) | Cell line | V.R. |
|---|---|---|---|
| Type 1 Herpes Simplex | 100 | KB | 0.8 |
| Do | 100 | KB | 0.8 |
| Do | 32 | KB | 1.0 |
| Do | 320 | RK13 | 0.4 |
| Do | 320 | KB | 0.5 |
| Do | 320 | HeLa | 0.4 |
| Type 2 Herpes Simplex | 320 | KB | 0.8 |
| Do | 320 | KB | 0.8 |
| Vaccinia | 320 | KB | 0.8 |

We prepared and tested the isomers 8-α-D-arabinofuranosyl-8-azaadenine (in anomeric mixture) and 3-α-D-arabinofuranosyl-8-azaadenine, finding no comparable antiviral activity.

EXAMPLE 15

As is noted hereinabove, Ara-A suffers from susceptibility to degradation by deaminase, and the compound 9-β-D-ribofuranosyl-8-azaadenine is also a substrate for the enzyme. Lionel N. Simon et al., Biochem 9, 573 (1970). In our studies, using a large excess (2.3 I.U.) of commercial calf intestine adenosine deaminase, adenosine itself was completely deaminated to inosine in less than two minutes. Under similar conditions (UV spectrophotometer at 279 nm. wavelength), 9-β-D-arabinofuranosyl-8-azaadenine completely deaminated in a similar period. The corresponding α anomer, however, showed no spectral change and therefore no deamination after 30 minutes. Thin layer chromatography of the reaction mixture against starting materials in the solvent system ethyl acetate/water/n-propanol (4:2:1), upper phase, confirmed complete deamination of the β anomer and that the α anomer of the invention was unchanged by the enzyme.

Solubility of the 9-D-arabinofuranosyl-8-azaadenines of the invention may be increased for in vivo applications by treating the free nucleoside with excess POCl$_3$ in trimethyl phosphate according to the procedure of M. Yoshikawa et al. Bull. Chem. Soc. (Japan) 42, 3505 (1969) to form the 5'-phosphate. Use of acyl rather than benzyl-blocked sugar halides as starting materials will, by acyl participation in formation of a stabilized carbonium ion, exclusively form the α-azido sugar where that is desired. Other modifications within the spirit and scope of the invention will occur to the art-skilled in light of this disclosure, by which there have been provided antiviral agents having enhanced resistance to enzymatic deamination, intermediates and methods therefor, and a variety of other compounds of promising utility.

What is claimed is:
1. 9-D-Arabinofuranosyl-8-azaadenine.
2. 9-α-D-Arabinofuranosyl-8-azaadenine.
3. A 5'-phosphate of a compound according to claim 1.
4. The 5'-phosphate of the compound of claim 2.
5. An anomeric mixture of 2,3,5-tri-O-benzyl-α-D-arabinofuranosyl azide and 2,3,5-tri-O-benzyl-β-D-arabinofuranosyl azide.
6. 2,3,5-tri-O-benzyl-α-D-arabinofuranosyl azide.
7. 2,3,5-tri-O-benzyl-β-D-arabinofuranosyl azide.
8. A compound selected from the group consisting of

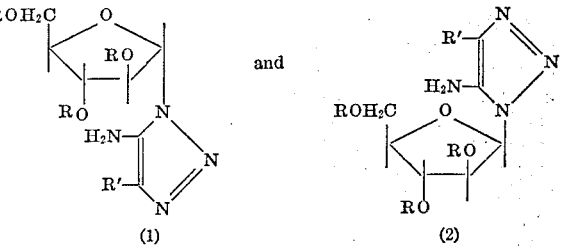

wherein R is hydrogen, benzyl or C$_1$–C$_{18}$ acyl, and R' is carbamoyl or cyano.

9. Compound (1) of claim 8 wherein R is hydrogen or benzyl and R' is cyano.
10. Compound (1) of claim 8 wherein R is hydrogen or benzyl and R' is carbamoyl.
11. A compound according to claim 8 wherein R is acetyl.
12. 1-α-D-Arabinofuranosyl - 5 - amino - 4-carbamoyl-v-triazole.
13. 1-β-D-Arabinofuranosyl - 5 - amino-4-carbamoyl-v-triazole.
14. A method which comprises the steps of (1) reacting alkali azide and 2,3,5-tri-O-benzyl-D-arabinofuranosyl halide to effect azide displacement of halogen, yielding a first anomeric mixture of α- and β-1-azido sugars, and (2) effecting ring closure by reacting said sugars with cyanoacetamide, yielding a mixture of 1-(2',3',5'-tri-O-benzyl-α,β-D-arabinofuranosyl)-5-amino - 4 - carbamoyl-v-triazole richer in α-anomer than said first anomeric mixture.
15. A method according to claim 8 wherein sodium azide and 2,3,5-tri-O-benzyl-D-arabinofuranosyl chloride are reacted in Step (1).

References Cited

UNITED STATES PATENTS 3,296,089 1/1967 Nakayama et al. ___ 260—211.5 R
3,407,191 10/1968 Gerzon et al. ____ 260—211.5 R
3,535,207 10/1970 Shiro et al. _____ 260—211.5 R JOHNNIE R. BROWN, Primary Examiner U.S. Cl. X.R.

424—180